Figures 3, 6:
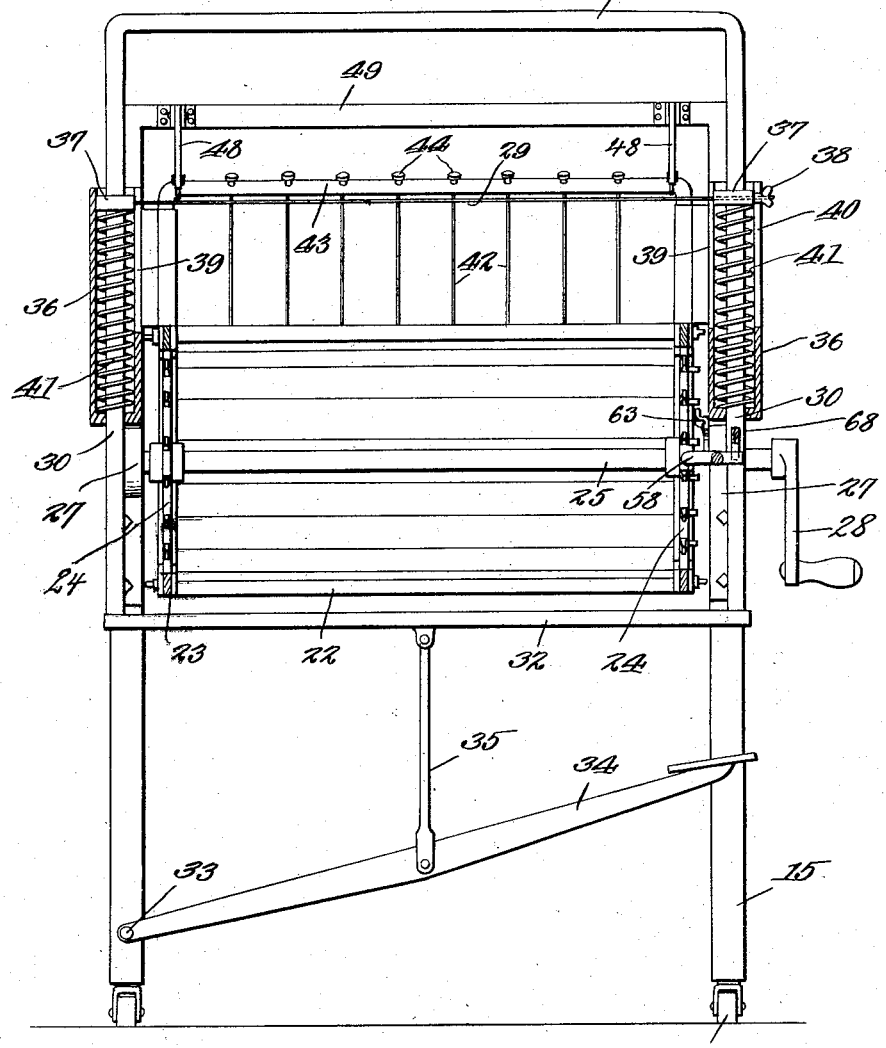

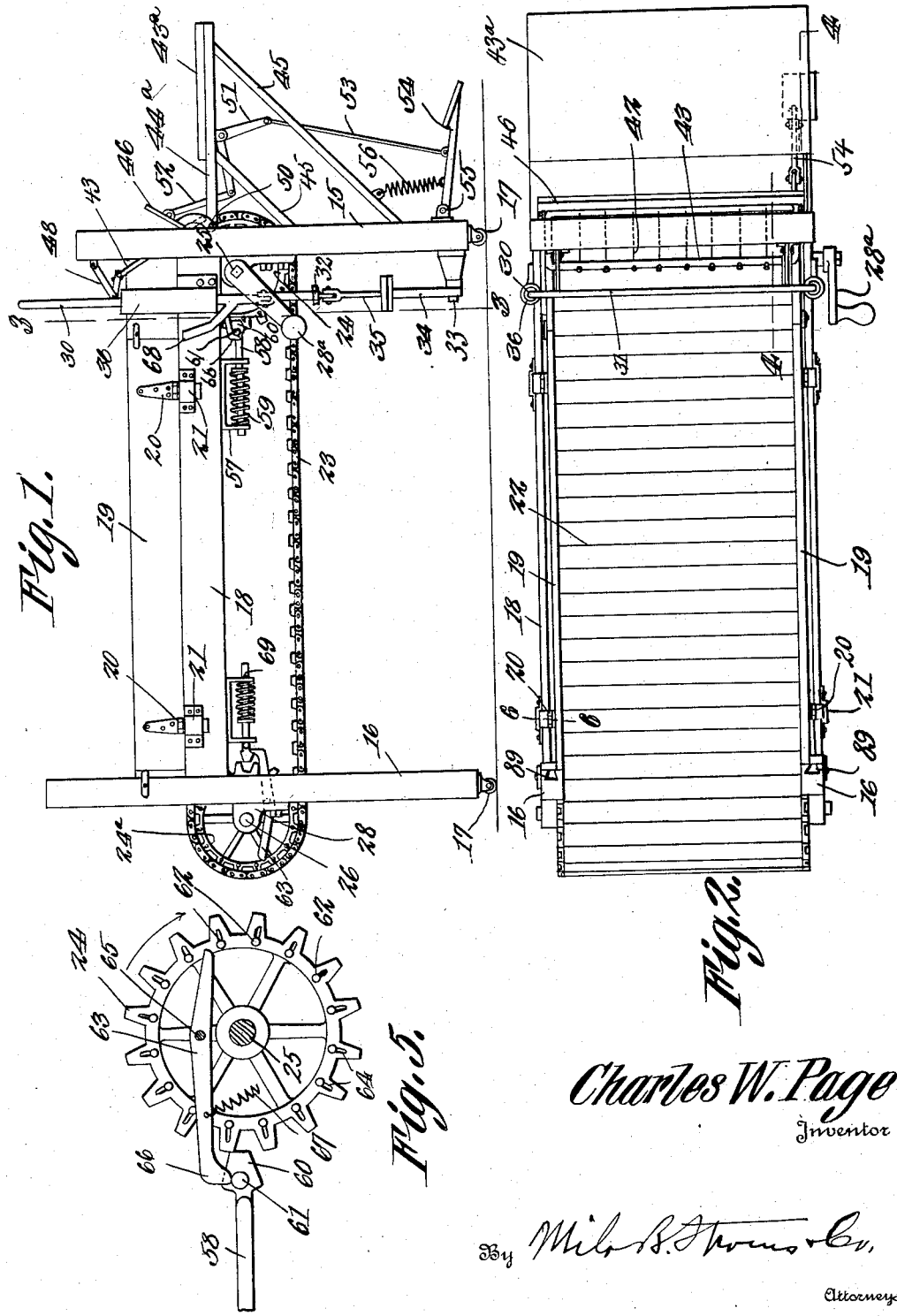

C. W. PAGE.
BUTTER CUTTER.
APPLICATION FILED MAY 11, 1916.

1,201,865.

Patented Oct. 17, 1916.
4 SHEETS—SHEET 2.

Charles W. Page
Inventor

Attorneys

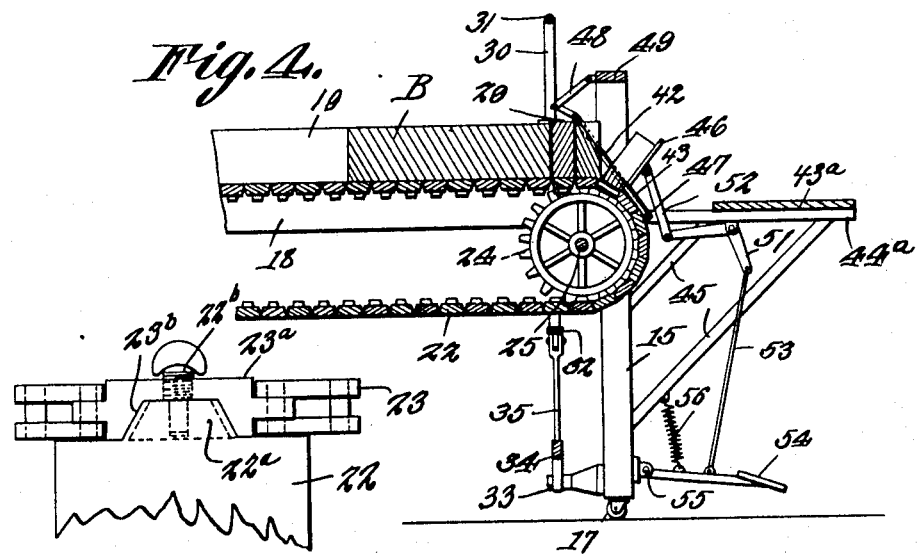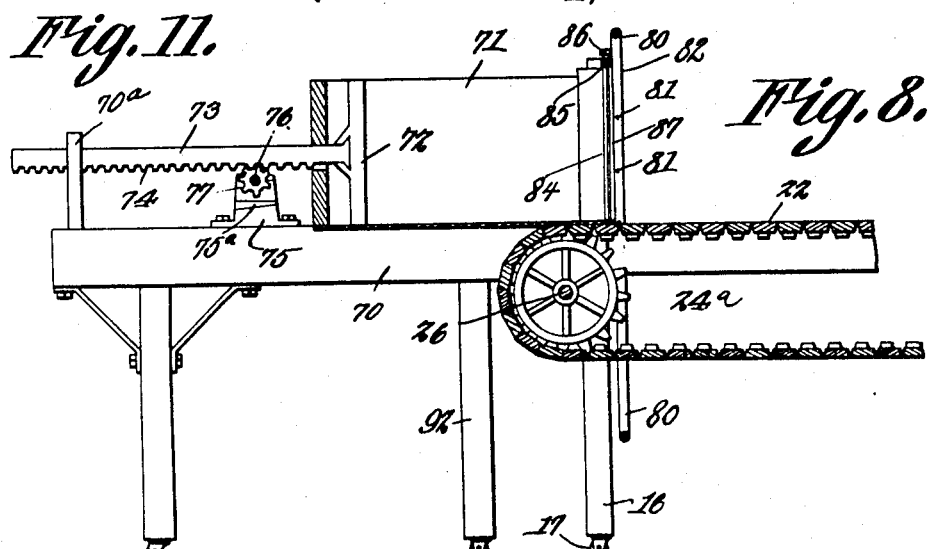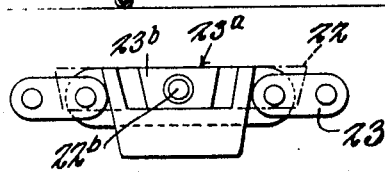

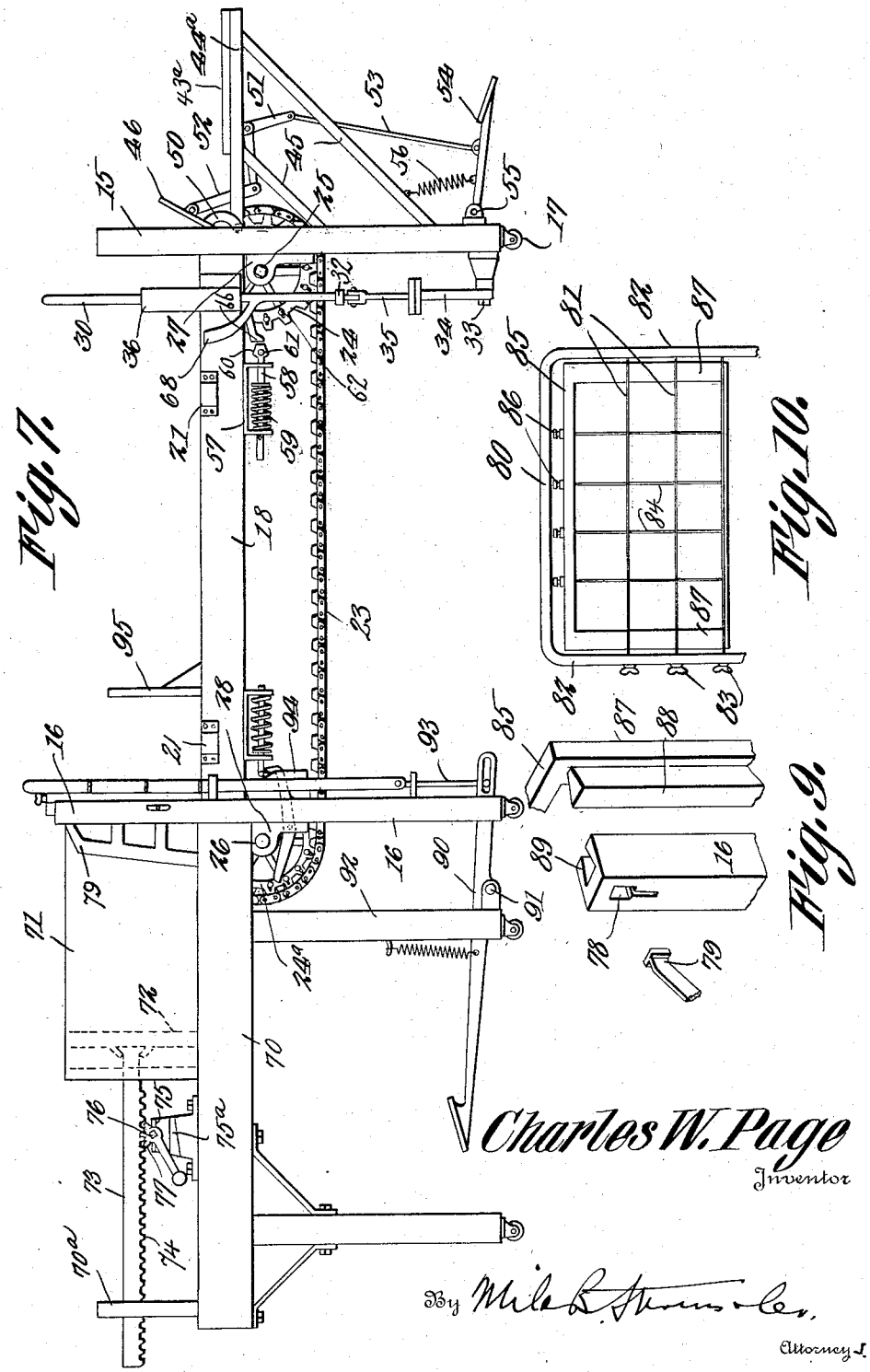

UNITED STATES PATENT OFFICE.

CHARLES W. PAGE, OF CATHLAMET, WASHINGTON.

BUTTER-CUTTER.

1,201,865.  Specification of Letters Patent.  Patented Oct. 17, 1916.

Application filed May 11, 1916. Serial No. 96,829.

*To all whom it may concern:*

Be it known that I, CHARLES W. PAGE, a citizen of the United States, residing at Cathlamet, in the county of Wahkiakum and State of Washington, have invented new and useful Improvements in Butter-Cutters, of which the following is a specification.

This invention relates to apparatus for dividing a mass of butter into individual pieces or blocks of uniform size, and the invention has for its object to provide a simple and efficient apparatus of this kind which is easy to operate.

The invention also has for its object to provide an attachment whereby the butter may be divided into still smaller sizes or cubes.

With the objects stated in view, the invention consists in a novel combination and arrangement of parts to be hereinafter described and claimed, and in order that the same may be better understood, reference is had to the accompanying drawings forming a part of this specification.

In the drawings, Figure 1 is a side elevation of the apparatus; Fig. 2 is a plan view thereof; Fig. 3 is an enlarged cross-section on the line 3—3 of Fig. 1; Fig. 4 is a longitudinal section on the line 4—4 of Fig. 2; Fig. 5 is an elevation of the trip device; Fig. 6 is a sectional detail on the line 6—6 of Fig. 2. Fig. 7 is a side elevation of a cube-cutting attachment; Fig. 8 is a longitudinal section of the cube-cutting attachment; Fig. 9 is a detail in perspective showing certain parts of the cube-cutting attachment separated; Fig. 10 is an elevation of the cutter of said attachment; Fig. 11 is a plan view of one end of one of the conveyer slats showing the connection between the same and one of the chains, and Fig. 12 is an elevation of one of the special links to which the slat is connected.

Referring specifically to the drawings, the supporting frame of the apparatus comprises two laterally spaced uprights or posts 15 at one end of the apparatus, and similar posts 16 at the other end, these posts being mounted on caster wheels 17 so that the apparatus may be easily shifted around. The posts 15 and 16, on both sides of the frame, are connected by side boards 18 extending horizontally therebetween. These side boards carry top extension boards 19 which are detachable, they being provided with hinges 20. As shown in Fig. 1 one of the leaves of these hinges is fixed to the board 19 and the other leaf is removably seated under a strap 21 carried by the board 18.

Between the side boards 18 runs an endless conveyer on which the mass B of the butter to be cut is placed, and by which it is carried to the cutting mechanism. The conveyer is in the form of a belt made up of cross slats 22 carried at their ends on chains 23 running over sprocket wheels 24 and 24$^a$, respectively, mounted on transverse shafts 25 and 26, respectively. The shaft 25 is supported in bearings 27 carried by the posts 15, and the shaft 26 is supported in bearings 28 carried by the posts 16. The shaft 25 is provided with a hand crank or other suitable operating device 28$^a$ whereby the conveyer is operated so that its upper run on which the butter is placed, is made to travel in the direction of the sprocket wheel 24, the cutting mechanism being at this end of the apparatus. The upper run of the conveyer is level with the top of the side boards 18, and the extension boards 19 therefore serve to keep the butter on the conveyer and prevent it from dropping off the same sidewise.

The mass of butter B on the conveyer 22 is cut into slabs by a horizontal cutting wire 29 extending transversely above the conveyer and carried by a vertically reciprocatory support, which latter, when it is lowered, carries the wire through the mass of butter and cuts off a slab therefrom. This support comprises two laterally spaced, vertical rods 30 connected at the top by a cross rod 31, and at the bottom by a cross bar 32, the cross rod and cross bar being vertically spaced a sufficient distance to clear the conveyer and allow the necessary amount of vertical travel of the wire 29 to make the cuts. To one of the posts 15 is fulcrumed, as indicated at 33, a foot lever 34 which is operatively connected to the bottom cross bar 32 by a link 35. The rods 30 are guided in housings 36 fixed to the side boards 18 and have collars 37 to which the ends of the wire 29 are connected in any suitable manner, with a tension device 38 at one end. The inner sides of the housings have slots 39 to accommodate the wire 29, and one of the housings has a slot 40 to accommodate the tension device 38. Between the collars 37 and the bottom of the housings 26, are springs 41 which are coiled around the rods 30 and serve to elevate the same after the cut has been made.

It will be evident from the foregoing that when the foot lever 34 is depressed, the rods 30 descend and carry the wire 29 down through the mass of butter B on the conveyer 22, and when the foot lever is released, the springs 41 elevate the rods and return the wire to its normal position above the mass of butter, ready for the next cut.

The slab of butter cut off by the wire 29 must also be divided into individual pieces, this being done by a series of wires 42 arranged vertically and extending in a row transversely of the conveyer 22. The wires 42 are carried by a rectangular frame 43 and are also provided with suitable tension devices 44. This frame is back of the wire 29 so that the slab of butter cut off by the latter is next cut into small pieces by the wires 42 as the slab is advanced by the conveyer. Back of the frame is a table 43ª designed to receive the pieces of butter preparatory to wrapping the same. This table is supported by horizontal side bars 44ª extending from the posts 15 and provided with braces 45. The table 43ª is spaced from the posts 15 and between the latter and the table works a swinging shelf 46 to be described more fully hereinafter. The frame 43 is pivoted at its lower end, as indicated at 47 to the bars 44ª adjacent to the posts 15, and it is loosely connected, at its upper end, by links 48 to a cross bar 49 connecting the top of said posts. The frame 43 is thus yieldingly supported so that the wires 42 may give slightly when the slab of butter is forced therebetween. The frame 43 is set so that the wires are inclined toward the advancing slab of butter.

The shelf 46 is located back of the wires 42 to receive the butter as it passes the same, and it has arms 50 at the bottom which are pivoted to the side bars 44ª. To one of the side bars 44ª is fulcrumed an angle lever 51 having one of its branches connected by a link 52 to the shelf 46. The other branch of the lever is connected by a rod 53 to a foot lever 54 fulcrumed at 55 to one of the posts 15. A spring 56 anchored to one of the braces 45, and connected to the foot lever 54, serves to elevate the same when it is released after having been depressed. The shelf 46 is normally in elevated position behind the wires 42, and upon depressing the foot lever 54 it is lowered to come flush with the table 43ª so that the butter may be easily pushed over to the latter.

In operation, the conveyer 22 is actuated to advance the mass of butter B thereon a predetermined distance, this depending on the width of the slab to be cut off. The conveyer is then stopped, and the wire 29 is operated to make the cut, after which the conveyer is again put in motion to advance the mass of butter for the next cut and also to advance the slab to the cutting wires 42. The slabs are pushed forward by the advancing mass of butter and pushed, one after the other, through the wires 42 and on to the shelf 46. Upon reaching the shelf 46, the wires 42 have passed through nearly the entire slab of butter so that when the shelf is lowered the cuts are completed and the slab, cut up into individual pieces, lies on the shelf adjacent to the table 44ª to which the butter may now be pushed to wrap up the individual pieces.

The operation of the conveyer 22 is automatically timed and controlled by the following means: Adjacent to the sprocket wheel 24, the side board 18 carries a bracket 57 which supports a slidable latch bolt 58 provided with a spring 59 for advancing the same. The bolt 58 has a head 60 at one end shaped to fit in the spaces between the teeth of the sprocket wheel 24, and on one side of this head is a lateral abutment or pin 61. On one face of the sprocket wheels are mounted outstanding pins 62 serving as tappets to actuate a trip lever 63. The pins are adjustably mounted in radial slots 64 in the sprocket wheel 24. The trip lever 63 is pivoted intermediate its ends, as shown at 65 to the bearing 27 of the sprocket wheel shaft 25 and it is so positioned that one of its ends is in the path of the pins 62. The other end of the lever is located alongside the head 60 of the latch 58 and has an enlargement 66 adapted to engage the pin 61. To the enlarged end of the lever 63 is connected a spring 67 for a purpose to be presently described.

On one of the side rods 30 of the vertically reciprocatory frame which carries the cutting wire 29 is a cam or tappet arm 68 which is positioned to strike the pin 61 at certain times and retract the latch 58 the cam being shaped to push the latch back by a wedging action when the rod 30 descends.

The operation of the conveyer controlling means is as follows: The latch 58 is normally in advanced position; with its head 60 seating in the space between two adjacent teeth of the sprocket wheel 24, so that said sprocket wheel is locked and the conveyer 22 is held stationary. The foot lever 34 may now be operated to lower the wire 29 through the mass of butter B on the conveyer and cut a slab therefrom as hereinbefore described. As the frame of the cutting wire descends, the cam 68 wipes along the pin 61 and forces the latch 58 back to release the sprocket wheel 24, this release taking place at the end of the cutting stroke. The enlarged end 66 of the lever 63 is normally above the pin 61 and the spring 67 tends to swing this end of the lever downward. Thus when the latch is forced back by the cam 68 and the pin 61 moves back until it clears the lever end, the end 66 of the lever is pulled down to come in front of the pin so that the latch is now held retracted and prevented from shooting forward to lock the sprocket wheel. The hand crank 28ª may now be operated to advance the conveyer to present the mass of butter thereon for the next cut, and when the pin 62 next to the forward end of the lever 63 strikes the same, the lever is tripped and its end 66 rises from in front of the pin 61, leaving the latch 58 free to be advanced by its spring 59 to enter the next space between the teeth of the sprocket wheel, thus again locking the conveyer. The mass of butter has now been advanced the required distance for the next cut, which is now taken, and the operation is then repeated and continued until the entire mass has been cut up. The number and spacing of pins 62 determines the extent of the successive movements of the conveyer, and consequently the thickness of the slabs cut off the mass of butter.

A controlling device as hereinbefore described is also employed in connection with the sprocket wheel 24ª when the cube-cutting attachment to be presently described is employed, but this device is placed in inoperative position when the cube-cutting attachment is not in use, by retracting its latch rod and holding it retracted by means of a pin 69. In a similar manner the controlling device of the sprocket wheel 24 is held in operative position when the cube-cutting attachment is in use.

The cube-cutting attachment comprises the following parts: A table 70 is connected to the posts 16 to form an extension frame and to support a receptacle 71 in which the butter to be cut is placed. In this receptacle works a reciprocatory plunger 72 having a stem 73 provided on the bottom with a rack 74. The table 70 also supports a bearing 75 for the shaft 76 of a pinion 77 which is in mesh with the rack 74. The shaft 76 has a crank handle or other suitable actuating device, and when operated in the proper direction the plunger 72 is advanced to push the butter in the receptacle 71 forward. The receptacle 71 is anchored to the posts 16, the latter having recesses 78 to receive bracket arms 79 extending from the receptacle.

In front of the forward end of the receptacle, this end being open, is mounted a frame 80 carrying a series of parallel and spaced horizontal cross wires 81 extending transversely between side bars 82 of said frame, and provided with suitable tensioning means 83. A series of parallel and spaced vertical wires 84 is also provided the same being carried by a rectangular frame 85 and also provided with tensioning means 86. The side bars 87 of the frame 85 have dovetailed ribs 88 seating in corresponding channels 89 in the posts 16, the latter therefore serving to support the frame.

The frame 80 is vertically movable so that it may be carried upward to push the wires 81 through the butter to make a vertical cross cut. This operation is effected by a foot lever 90 fulcrumed at 91 to one of the legs 92 of the table 70 and having a connection 93 with the bottom of the frame 80.

The attachment is so located that the butter, as it is cut into cubes, enters the conveyer 22 and is carried to the shelf 46 which is operated as before to bring the cubes to the wrapping table 43ª. The cutting devices 29 and 42 will, of course, be removed when the cube-cutting attachment is used. After each cut of the wires 81 the butter enters the conveyer which is operated periodically in the same manner as hereinbefore described. The cam which retracts the latch of the controlling device is carried by one of the side bars 82 of the frame 80, and it is shown at 94 in Fig. 7. At the commencement of the operation an upright board 95 is placed on the conveyer to hold the cubes, and when it reaches the discharging end of the conveyer it will be removed.

The bearing 75 is provided with a wedge or other suitable means 75ª whereby the shaft 76 may be lowered if a smaller plunger 72 is to be used, this adjustment being necessary in order to keep the stem 73 in the center of the plunger. The rear end of the table carries a guide 70ª for the outer end of the stem 73 to prevent the same from dropping down.

The connection between the slats 22 and the chains 23 is such that the slats may be removed from the chains for the purpose of cleaning and airing the same. One of these connections is shown in Figs. 11 and 12. The chains are provided at regular intervals with special links 23ª, one of which is shown in Figs. 11 and 12. This link has a tapering socket 23ᵇ in one side in which seats a tenon 22ª at the adjacent end of the slat, said tenon being held in the socket by a pin 22ᵇ which is threaded through the special link. Thus, it will be seen that when the pins 22ᵇ are removed the slats are disconnected and they automatically drop off the chains when they pass around the sprocket wheels 24.

I claim:—

1. A butter cutting apparatus comprising an endless conveyer, means for operating the conveyer, a vertically reciprocating cutter operating above the conveyer, a table adjacent to the discharging end of the conveyer, a pivoted shelf extending in upright position across said end of the conveyer, and means for tilting said shelf downward to the level of the top of the table.

2. A butter cutting apparatus comprising an endless conveyer, a vertically reciprocating cutter operating above the conveyer, means for operating the conveyer, said means including a sprocket wheel, means for locking the sprocket wheel when the cutter is operating, and means for releasing the sprocket wheel at the end of the cut.

3. A butter cutting apparatus comprising an endless conveyer, a vertically reciprocating cutter operating above the conveyer, means for operating the conveyer, means for locking the conveyer when the cutter is operating, and means controlled by the cutter for releasing the conveyer at the end of the cut.

4. A butter cutting apparatus comprising an endless conveyer, a vertically reciprocating cutter operating above the conveyer, means for operating the conveyer, said means including a sprocket wheel, a latch for locking the sprocket wheel, a frame carrying the cutter, a cam on the frame for retracting the latch, a trip lever for holding the latch retracted, and pins on the sprocket wheel for tripping the lever to release the latch.

5. A butter cutting apparatus comprising an endless conveyer, a vertically reciprocating cutter operating above the conveyer, means for operating the conveyer, said means including a sprocket wheel, a latch for locking the sprocket wheel, said latch having a side pin, a frame carrying the cutter, a cam on the frame and located to engage the side pin to retract the latch, a trip lever for holding the latch retracted, and pins on the sprocket wheel for tripping the lever to release the latch.

6. A butter cutting apparatus comprising an endless conveyer, means for operating the conveyer, a vertically reciprocating cutter operating above the conveyer, a table adjacent to the discharging end of the conveyer, a pivoted shelf extending in upright position across said end of the conveyer, means for tilting said shelf downward to the level of the top of the table, and a series of vertical cutting wires extending transversely of the conveyer between the aforesaid cutter and the shelf.

In testimony whereof I affix my signature.

CHARLES W. PAGE.

Signed in the presence of—
W. W. HEAD,
JOSEPH GIRARD.

Copies of this patent may be obtained for five cents each, by addressing the "Commissioner of Patents, Washington, D. C."